(12) United States Patent
Khajehnajafi

(10) Patent No.: US 8,190,376 B2
(45) Date of Patent: May 29, 2012

(54) SYSTEM AND METHOD FOR SOURCE IDENTIFICATION FOR A CHEMICAL RELEASE

(75) Inventor: Shahryar Khajehnajafi, Moorpark, CA (US)

(73) Assignee: Safer Systems, LLC, Camarillo, CA (US)

( * ) Notice: Subject to any disclaimer, the term of this patent is extended or adjusted under 35 U.S.C. 154(b) by 296 days.

(21) Appl. No.: 12/543,472

(22) Filed: Aug. 18, 2009

(65) Prior Publication Data

US 2010/0042332 A1    Feb. 18, 2010

Related U.S. Application Data

(60) Provisional application No. 61/089,714, filed on Aug. 18, 2008.

(51) Int. Cl.
*G06F 19/00*     (2011.01)
*G08B 29/00*     (2006.01)
(52) U.S. Cl. .......................................... 702/23; 340/506
(58) Field of Classification Search .................. 702/23, 702/182; 340/506, 522
See application file for complete search history.

(56) References Cited

U.S. PATENT DOCUMENTS

| | | | |
|---|---|---|---|
| 6,772,071 B2 | 8/2004 | Gilbert et al. | |
| 2005/0060759 A1* | 3/2005 | Rowe et al. | 725/143 |
| 2006/0187017 A1* | 8/2006 | Kulesz et al. | 340/506 |

OTHER PUBLICATIONS

Kathirgamanathan, P., et al., *Source release-rate estimation of atmospheric pollution from a non-steady point source at a known location*, Netherlands: Environmental Modeling and Assessment 2004, pp. 33-42.

Rao, S. K., *Source estimation methods for atmospheric dispersion*, Atmospheric Environment 41 (2007), Science Direct, pp. 6964-6973.

Haupt, Sue Ellen, et al., *Paradigms for Source Characterization*, 15th Joint Conference on the applications of air pollution meteorology with the A&WMA, New Orleans: American Meteorological Society, 2008., pp. 1-10.

Najafi, K., et al. *Use of Real-Time Measurements for Estimating Release Rate*, Institute of Chemical Engineers Symposium Series, American Institute of Chemical Engineers, 2003, 16 pages.

* cited by examiner

*Primary Examiner* — Bryan Bui
(74) *Attorney, Agent, or Firm* — Christie, Parker & Hale, LLP

(57) ABSTRACT

A system for predicting a source location and release rate of a hazardous substance uses the basic knowledge of meteorological information (wind speed, direction, and stability) and two or more concentration measurements of the chemical released. Horizontal dispersion information obtained from surface meteorological data at sensor locations are used to narrow the search domain for the release location, reducing the computational cost. Each of the possible release locations in the search domain and possible release rates are evaluated in a process that predicts a concentration measurement at a sensor, based on a predicted location and release rate. The location and release rate that results in a least error when compared to an actual concentration measurement at the sensor are chosen as the source of the chemical and the release rate from the source.

26 Claims, 9 Drawing Sheets

SYSTEM AND METHOD FOR SOURCE IDENTIFICATION FOR A CHEMICAL RELEASE

CROSS-REFERENCE TO RELATED APPLICATION(S)

This application claims the benefit of U.S. Provisional Application No. 61/089,714, filed on Aug. 18, 2008, the content of which is incorporated herein by reference.

BACKGROUND OF THE INVENTION

With the ever-growing chemical industry, chemical storage and transportation may pose a threat to neighboring communities should there be an accidental release. In order to safeguard the workers and communities, agencies such as the National Institute for Occupational Safety and Health (NIOSH) and the Environmental Protection Agency (EPA) have made it mandatory for all industrial facilities to comply with their listed rules and regulations. The Emergency Planning and Community Right-to-know Act (EPCRA) requires that the public be given access to information on chemicals at individual facilities for emergency planning in case of episodic releases at the site. A large number of state-of-the-art modeling technologies and engineering tools have been developed and are readily available to successfully predict and track a cloud or plume of a chemical during an accidental release using information on the release scenario and the meteorological data at the time of release. These models provide an assessment of the impact of a release and are useful for emergency planning in order to save lives and resources in the event of a release.

After the events of Sep. 11, 2001, the paradigm has shifted to predicting an intentional release of a toxic chemical, which has potentially high impact if the targets are public locations such as football stadiums, shopping malls, and army bases located either domestically or internationally. In such cases, identification of the source location and the rate of release becomes a big challenge for hazmat personnel tasked with responding to the chemical attack. This is in great contrast to situations involving an accidental chemical release where the source of a release is known, or, in most cases, can be quickly identified. Thus, there is a need for a system and method for quickly and reliably predicting the source of an intentional release of a hazardous substance.

SUMMARY OF THE INVENTION

An embodiment of the present invention locates the source of a chemical release using basic meteorological information, such as, for example, wind speed, direction, and stability, and two or more concentration measurements of the chemical released. Horizontal dispersion information obtained from surface meteorological data at sensor locations are used to narrow the search domain for the release location, reducing the computational cost. Each of the possible release locations in the search domain and possible release rates are evaluated in a process that predicts, based on each trial release location and release rate, a concentration measurement at the sensor. The location and release rate that results in a predicted concentration with a least error when compared to an actual concentration measurement at the sensor are chosen as the predicted location and release rate.

According to one embodiment, the present invention is directed to a system and a corresponding method for predicting a release location for a substance released into a surrounding medium that includes substance sensors, a weather sensor, and a processor. The various substance sensors are each configured to detect a concentration of the substance at a corresponding sensor location. The weather sensor obtains meteorological data for providing to the processor. A memory coupled to the processor stores program instructions that are executed by the processor to locate the source of a chemical release, as well as a corresponding release rate, based on the meteorological data and the detected concentrations of the substance.

According to one embodiment of the invention, the processor identifies various search zones for the release location based on the meteorological data, where each of the search zones is associated with one of the plurality of substance sensors. The processor narrows the search zone to a common zone in which two or more of the search zones intersect, and segments the common zone into various nodes with each of the nodes being associated with location information.

The processor further identifies a local minimum for each of various trial release rates. Each identified local minimum is a difference between a predicted concentration and a measured concentration of the substance by the substance sensors that generates a least error for various trial release locations associated with the nodes. Each identified local minimum is associated with a particular one of the nodes and a particular one of the trial release rates.

The processor selects a smallest one of the various local minima as a global minimum value. The processor further identifies the location information of the node and the release rate associated with the global minimum value. The identified location information and release rate are then output as the predicted release location and release rate for the hazardous substance.

According to one embodiment of the invention, the identifying of each local minimum includes predicting for each of the nodes, the concentration of the substance at each of the plurality of substance sensors based on an assumption that the substance is released from the trial release location associated with the corresponding node at a particular one of the various trial release rates. A measured concentration of the substance at each of the substance sensors is also obtained. The processor compares an average of each of the predicted concentrations for the substance sensors against an average of the measured concentrations by the substance sensors. The processor stores in the memory as the local minimum for the particular one of the various trial release rates, a smallest difference between the average predicted concentration for a particular one of the nodes and the average measured concentration.

According to one embodiment of the invention, each of the search zones is a reverse corridor originating from the corresponding substance sensor and extending against a mean wind direction. The mean wind direction is obtained from the meteorological data provided by the weather sensor.

According to one embodiment of the invention, the reverse corridor is formed as a wedge with an apex at the corresponding substance sensor. An angle of the wedge is based on atmospheric turbulence information. The atmospheric turbulence information is determined based on meteorological data, such as, for example, wind speed and direction.

According to one embodiment of the invention, the processor invokes a Gaussian dispersion model for predicting the concentration of the substance at each of the substance sensors for each of the nodes.

Embodiments of the present invention help provide quick and accurate prediction of the release source that allows emergency responders to act quickly to eliminate or contain the release of a chemical from the identified source, and take the public out of harms way. Data regarding prediction of the source location and release rate are valuable pieces of information for emergency responders when seconds count. These and other features, aspects and advantages of the present invention will be more fully understood when considered with respect to the following detailed description, appended claims, and accompanying drawings. Of course, the actual scope of the invention is defined by the appended claims.

DETAILED DESCRIPTION OF THE INVENTION

Source characterization may be critical for emergency response when there is an accidental or intentional release or leak of a toxic or hazardous chemical into a surrounding medium. According to one embodiment of the invention, the source of a chemical release (also referred to as a release location or release source) is located using basic meteorological data and two or more concentration measurements of the chemical released. Specifically, various possible zones for the release location are identified based on the meteorological data, and the possible zones narrowed down to a single search domain in order to reduce computational costs. Each of the possible release locations in the search domain and possible release rates are evaluated in a process that predicts, based on each trial release location and release rate, a concentration measurement at the sensor. The location and release rate that results in a predicted concentration with a least error when compared to an actual concentration measurement at the sensor are chosen as the predicted location and release rate.

Figure 1:
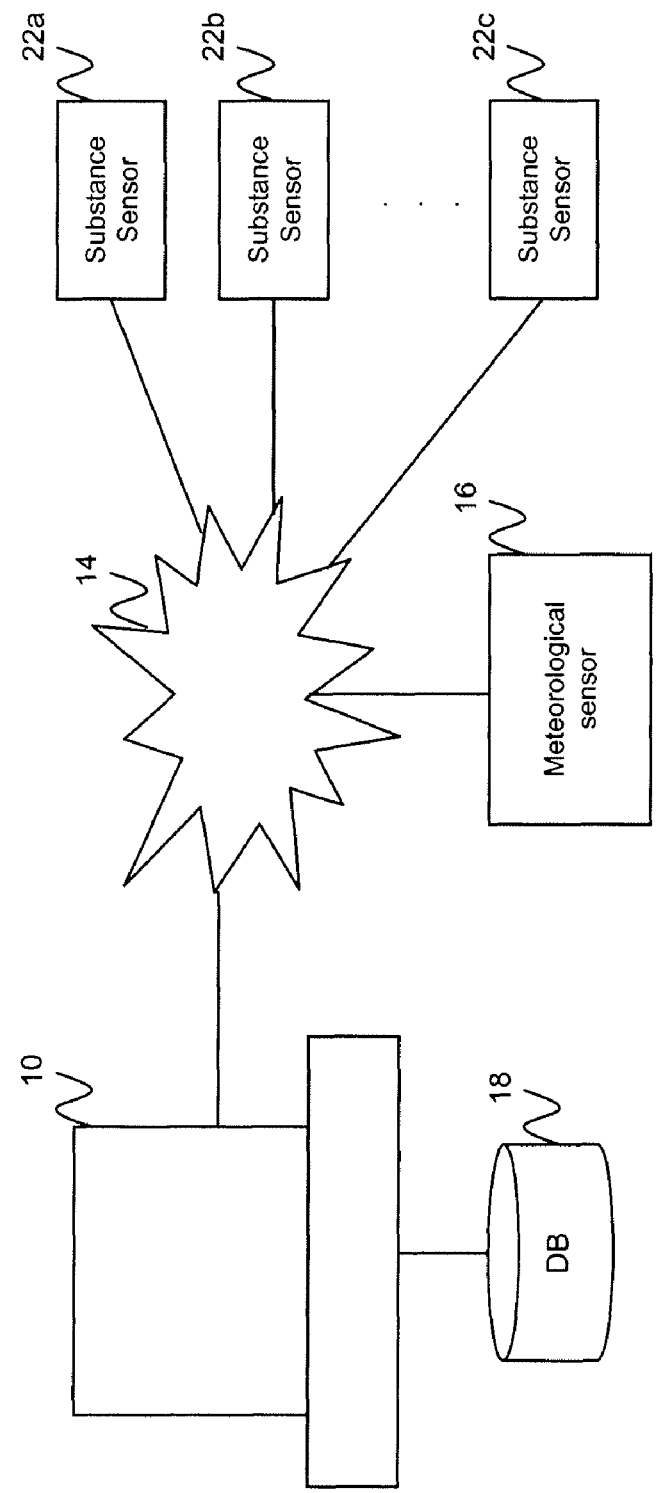
FIG. 1 is a schematic block diagram of a system for predicting a source location of a chemical release and a corresponding release rate according to one embodiment of the invention.

FIG. 1 is a schematic block diagram of a system for predicting a source location of a chemical release and a corresponding release rate according to one embodiment of the invention. The system includes a computer device 10 coupled to a plurality of sensors 22a-22c (collectively referred to as 22) over a data communications network 14. The data communications network 14 may be a local area network (LAN), private wide area network (WAN), the Internet, or any wired or wireless network environment conventional in the art.

According to one embodiment of the invention, the computer device 10 includes a memory that stores computer program instructions which, when executed by a processor, cause the computer to identify the source location and release rate of a hazardous substance.

According to one embodiment, the computer 10 is coupled to one or more weather sensors 16 that provide meteorological data such as wind speed, wind direction, solar radiation, and the like. Such meteorological information may alternatively be obtained from other sources such as, for example, other information devices (not shown) coupled to the Internet.

The computer 10 may also access a data store 18 storing data related to atmospheric turbulence that is categorized into various stability classes. The data store may be a disc drive, drive array, or any type of data storage device conventional in the art.

Figure 2:
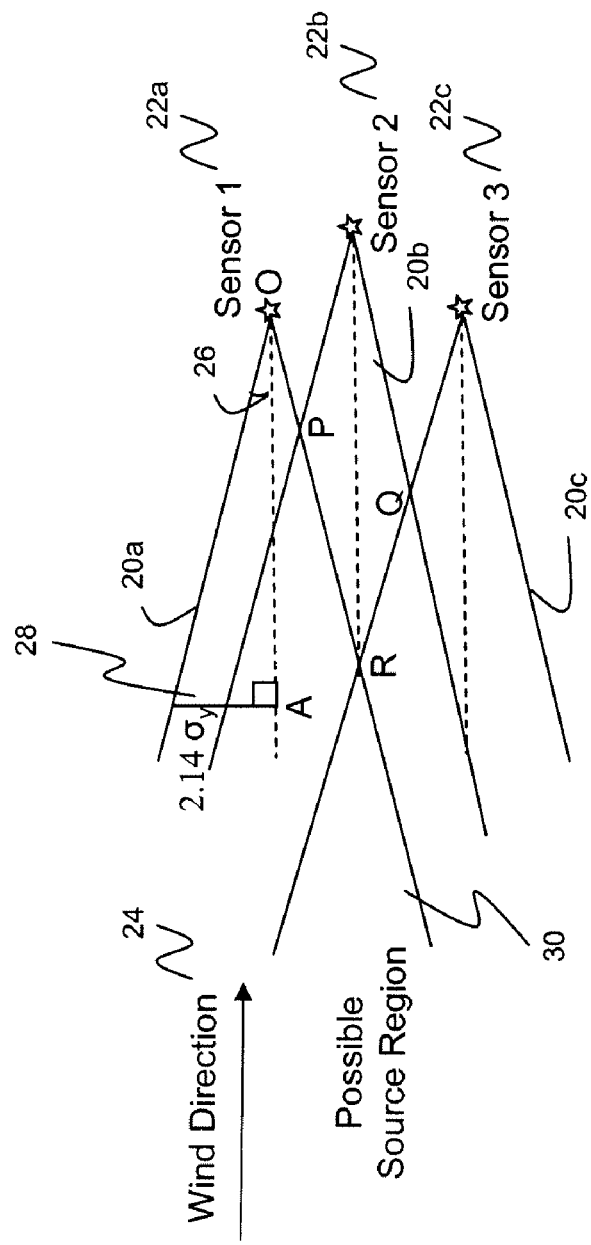
FIG. 2 is a conceptual diagram of a plurality of search zones generated by the system of FIG. 1, according to one embodiment of the invention.

FIG. 2 is a conceptual diagram of a plurality of search zones 20a-20c (collectively referred to as 20), generated by the computer 10 according to one embodiment of the invention. The search zones are also referred to as reverse corridors or back trajectories. According to one embodiment of the invention, back trajectory formulation is based on surface meteorological data obtained, for example, from the meteorological sensors 16 over the data communications network 14.

According to one embodiment of the invention, the computer device generates the reverse corridor 20 as a wedge originating from a known sensor location 22, where the sensor points in a mean wind direction 24 as measured by the meteorological sensor 16. For example, if the wind is detected as blowing from the west, the reverse corridor 20 is drawn from the east. The computer device then calculates a wedge angle 26 from a horizontal plume dispersion parameter $\sigma_y$. The horizontal plume dispersion parameter $\sigma_y$ is a function of atmospheric stability (or put otherwise, atmospheric turbulence) and puff travel time. Assuming a puff travel time of 10 minutes, $\sigma_y$ is obtained based on an equation of the form:

$$\sigma_y = ax^b \quad (1)$$

In equation (1), x is a distance value, and a, b are the constants determined by a Pasquill stability condition as is well known in the art. The values of a are therefore 0.4, 0.36, 0.34, 0.32, 0.32 and 0.31 for atmospheric stability classes ranging from A through F, respectively. The corresponding values of b are 0.91, 0.86, 0.82, 0.78, 0.75 and 0.71, for respectively the same stability classes. The appropriate horizontal stability class is determined by an azimuthal component of wind direction which is obtained from the meteorological data. In this regard, tables in the data store 18 storing information mapping the standard deviation of azimuthal fluctuation of wind direction to atmospheric stability classes are accessed in order to determine the appropriate a and b values. Such tables are also published by the EPA.

In order to calculate the wedge angle 26, a downward distance of x meters is assumed from a particular sensor 22, against the wind direction. In the example for sensor 22a, x is a distance for line segment OA, drawn to be parallel to the wind direction 24. An exemplary value for x may be, for example, 100 meters. A line segment 28 of length 2.14 $\sigma_y$, where $\sigma_y$ is the horizontal dispersion parameter found from equation (1) using an appropriate stability curve, is drawn perpendicular to OA at A. One half of the wedge 20a is then constructed by connecting the end of the line segment 28 opposite to A, to the sensor location 22a. The other half of the wedge 20a may then be constructed using the same wedge angle 26.

According to one embodiment of the invention, a factor of 2.14 is selected as a default for calculating the length of the line segment 28 because it sets the cloud width at which the concentration falls to about one percent of the centerline value. However, a person of skill in the art should recognize that the present invention is not limited to this default value, and other values may also be used as will be appreciated by a person of skill in the art.

The number of deployed sensors and their distribution play an important role in targeting the location of a chemical release. Rather than searching for an infinite space upwind of the sensors, the computer utilizes the sensors' distribution to narrow down the search zone.

In the exemplary embodiment of FIG. 2, three sensors are used: sensor 1, sensor 2 and sensor 3. The reverse corridor 20 for each sensor is then identified via the process described above. The wedge 20 identified for each sensor encompasses the area where the release could have occurred. The intersection of two wedges provides a region where any release initiated within that region would impact the two sensors. In the example illustrated in FIG. 2, the wedges identified for each sensor intersect with each other at points P for sensors 1 and 2, Q for sensors 2 and 3, and R for sensors 1 and 3. The intersection of all of the wedges from sensors 1, 2, and 3 form a common wedge (common search zone) 30 which is deemed to contain the most probable area of the release source location.

Figure 3:
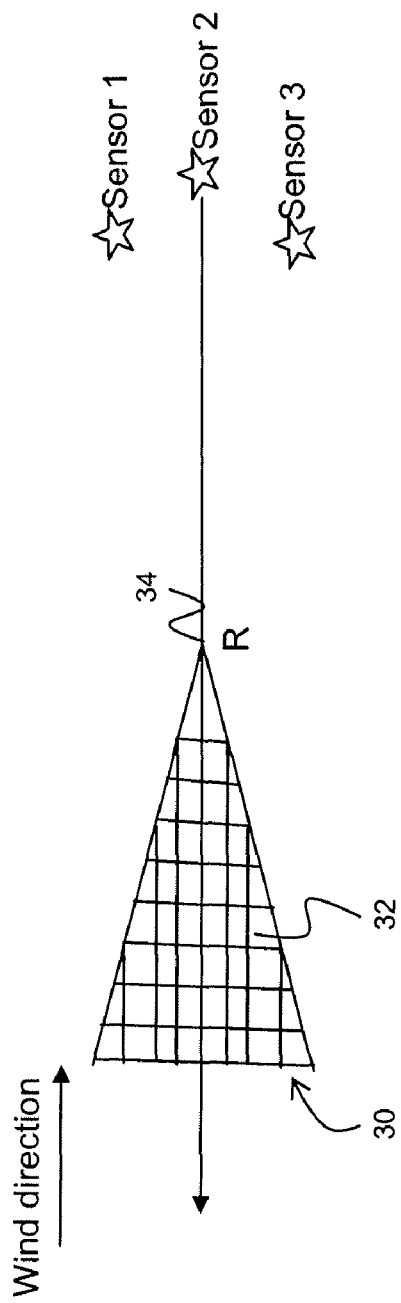
FIG. 3 is a simplified layout diagram of a common search zone according to one embodiment of the invention.

FIG. 3 is a simplified layout diagram of the common search zone 30 according to one embodiment of the invention. After the computer 10 identifies the common search zone 30, it overlays a mesh or grid that contains square cells with user definable dimensions. Nodes 32 on each cell define a locus of points used as possible source locations. According to one embodiment of the invention, a computational coordinate system is generated where its origin is an apex 34 of the common wedge and its x-axis runs parallel to the wind direction, and the y-axis runs in a cross-wind direction.

According to one embodiment of the invention, the location of a hazardous substance release is predicted from the common search zone. In this regard, the computer 10 transforms the positions of the sensors 22 from an actual Cartesian coordinate system used to identify the sensor positions, into the computational coordinate system, and executes a source locator algorithm which is based on two loops: an outer loop where a trial release rate is incremented, and an inner loop where the domain for possible source location is swept from the apex 34 of the common wedge up to a predefined distance in the direction opposite to the wind. According to one embodiment of the invention, the search domain is limited to a distance of 10 km from the apex 34.

For each trial rate and trial source location identified by a particular node 32 in the common search zone 30, a concentration value is predicted by the Gaussian model for each impacted sensor 22. Actual measured concentration at each sensor 22 is compared against the model prediction, and the error between the two values is recorded in memory. The minimum recorded value obtained from the inner loop is labeled a local minimum. For each trial rate, the procedure is repeated until an absolute minimum, referred to as a global minimum, is achieved. According to one embodiment of the invention, because this is a very intensive computing process, a Gaussian dispersion model is utilized to calculate predicted concentration measurements for a ground level release. A person of skill in the art should recognize that other dispersion models may also be used depending on the type of release, such as, for example, a box model, Lagrangian model, Eulerian model, and dense gas model, as will be apparent to a person of skill in the art.

In calculating a predicted concentration at each sensor position 22 using the Gaussian dispersion model, a wide range of possible values for the release rates are chosen, ranging, for example, from 0.01 through 10 kg/s, with an increment of 0.01 Kg/s. Thus, according to one embodiment of the invention, a total of 1000 different release rates are considered for the test. For each rate, the entire possible search domain 30 is swept to find the local average minimum error between the predicted and the measured values for all of the sensors 22. The absolute global minimum obtained from the simulation of all of the considered rate changes yields one or more of the most possible source locations and their corresponding release rates.

Figure 4:
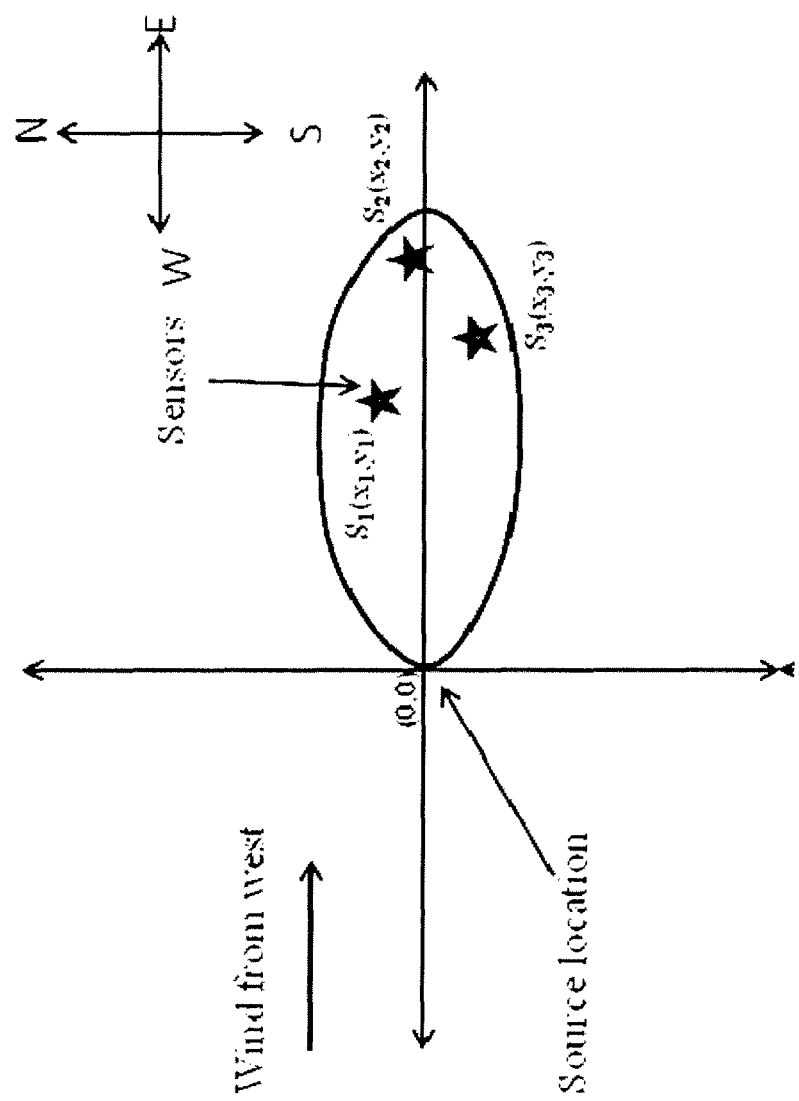
FIG. 4 is diagram of a plume/sensor impact according to one embodiment of the invention.

FIG. 4 illustrates a computational coordinate system with an apex of the common wedge at position (0, 0). In the exemplary embodiment of FIG. 4, three sensors $S_1$, $S_2$ and $S_3$ are located within a plume 40 at a distance $(x_1, y_1)$, $(x_2, y_2)$ and $(x_3, y_3)$ respectively from the apex, such that they are impacted by a chemical generating the plume. According to one embodiment of the invention, the predicted concentrations at each sensor location in the computational coordinate system, $C_1(x_1, y_1)$, $C_2(x_2, y_2)$ and $C_3(x_3, y_3)$, can be calculated using a Gaussian form of plume equation:

$$\langle C \rangle(x, y, z) = \frac{Q_m}{2\Pi\sigma_y\sigma_z u}\exp\left(\frac{-y^2}{2\sigma_y^2}\right) \times \left\{\exp\left[-\frac{(z-H_r)^2}{2\sigma_z^2}\right] + \left[-\frac{(z+H_r)^2}{2\sigma_z^2}\right]\right\} \quad (2)$$

$\langle C \rangle(x, y, z)$ = Average concentration
$Q_m$ = Release rate (Kg/s)
$\sigma_y$, $\sigma_z$ = Dispersion coefficients = f (stability class, downwind distance)
u = Wind speed (m/s)
x, y, z = sensor position coordinates (m)
$H_r$ = Release height (m)

If an assumption may be made that z=0 and H=0, equation (2) can be simplified to:

$$\langle C \rangle(x, y, z) = \frac{Q_m}{2\Pi\sigma_y\sigma_z u}\exp\left(\frac{-y^2}{2\sigma_y^2}\right) \quad (3)$$

In applying formulas 2 or 3, $\sigma_y$ is a horizontal dispersion coefficient, and $\sigma_z$ is a vertical dispersion coefficient. The horizontal dispersion coefficient $\sigma_y$ is calculated according to formula (1), wherein the x parameter is the distance, in meters, between a trial node being considered, and the particular substance sensor. The computation of such a distance given the position coordinates of the trial node and the position coordinates of the sensors, will be well understood by a person of skill in the art.

Similarly, the dispersion coefficient $\sigma_z$ is calculated according to the following formula:

$$\sigma_z = cx^d \quad (4)$$

where the x parameter is the distance, in meters, between a trial node being considered, and the particular substance sensor. The values of c are 0.000998, 0.0481, 0.1187, 0.1077, 0.135, 0.0949 for atmospheric stability classes of A through F, and the values of b are 1.89, 1.11, 0.915, 0.822, 0.745, 0.727 for the same stability classes.

Figure 5:
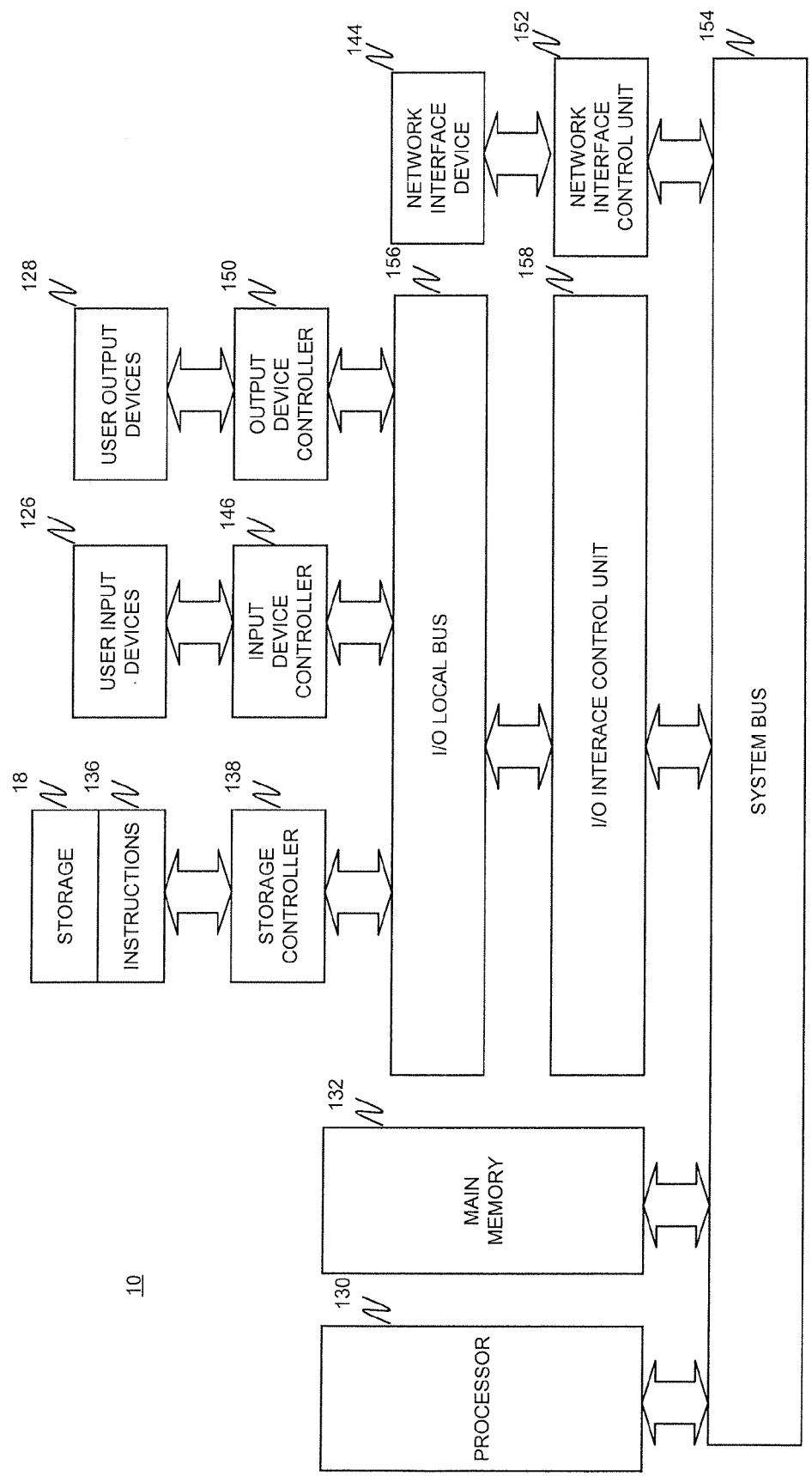
FIG. 5 is an architecture block diagram of a computer predicting a source location and release rate of a hazardous substance according to one embodiment of the invention.

FIG. 5 is an architecture block diagram of the computer 10 predicting the source location and release rate of a hazardous substance according to one embodiment of the invention. The computer includes a processor 130 operatively coupled via a system bus 154 to a main memory 132 and an input/output (I/O) interface control unit 158. The I/O interface control unit 158 is operatively coupled via an I/O local bus 156 to a storage controller 138. The processor 130 is coupled via the I/O interface control unit 158, the I/O local bus 156, and the storage controller 138, to the storage device 18. Computer program instructions 136 for implementing different functionalities of the computer 10 are stored in the storage device 18 until the processor 130 retrieves the computer program instructions and stores them in the main memory 132. The processor 130 then executes the computer program instructions stored in the main memory 132 to implement a particular functionality. Such functionality may include constructing search zones for two or more sensors, narrowing down the search zone, and predicting a source location of a chemical release from the search zone along with a corresponding release rate. The functionality may also include providing a graphical user interface for allowing a user to request source identification in response to a hazardous substance released to the environment.

User commands, such as, for example, commands to initiate the source identification, are input by a user via one of various user input devices 126 controlled by an input device controller 146 via a Universal Serial Bus (USB) communications link or via any wired or wireless connection known in the art. Audio visual outputs to the user are provided via user output devices 128 controlled by an output device controller 150.

Information from the meteorological sensor 16 and substance sensors 22 are received by a wired or wireless network interface device 144 controlled by a network interface control unit 152, and also forwarded to the processor 130 via the system bus 154. The received information is used by the processor to generate the back trajectories 20 for the various sensors 22. In this regard, the processor 130 communicates with the storage controller 138 to retrieve from the data store 18 the appropriate stability values for an identified atmospheric stability class. The retrieved data is then forwarded to the processor 130 via the system bus 154 to calculate the horizontal plume dispersion parameter and from that, the wedge angle 26. The processor 130 then proceeds to narrow the search zone by identifying an intersecting search zone based on the generated wedges, and identifies the release location from the intersecting search zone. According to one embodiment of the invention, the processor 130 outputs a geographical location matching the identified release location.

Figure 6:
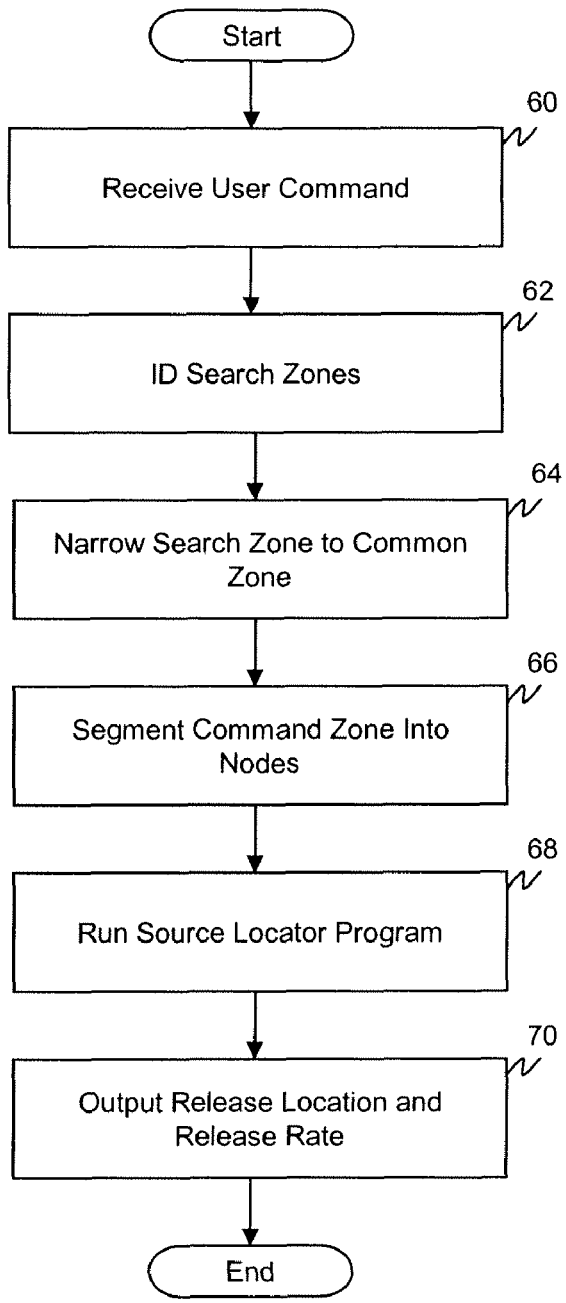
FIG. 6 is a flow diagram of a process for predicting a source location of a chemical release and a corresponding release rate according to one embodiment of the invention.

FIG. 6 is a flow diagram of a process for predicting a source location of a chemical release and a corresponding release rate according to one embodiment of the invention. The steps of the process may be executed in the indicated order or in any other order recognized by a person of skill in the art.

The process starts, and in step 60, the processor receives a user command entered via the input device 126 to initiate a source location identification process.

In step 62, the processor identifies a search zone 20 for each sensor 22 based on meteorological data received from the meteorological sensors. According to one embodiment of the invention, each of the search zones is a reverse corridor originating from the corresponding substance sensor and extending against a mean wind direction, wherein an angle of the reverse corridor is based on a determination of atmospheric turbulence (or stability) based on the received meteorological data.

In step 64, the processor narrows the search domain to a common zone 30 in which two or more of the search zones 20 intersect.

In step 66, the processor segments the common zone 30 into various location nodes 32. According to one embodiment of the invention, each of the nodes is associated with location information, such as, for example, in the form of an (x, y) coordinate in a computational coordinate system where the apex of the common zone is set as position (0, 0). The positions of the sensors are also transformed to the computational coordinate system for purposes of determining the source of the chemical release.

In step 68, the processor runs a source locator program stored in the memory 132 for identifying the release location and the release rate of the hazardous material.

In step 70, the processor outputs the identified release location and release rate by displaying, for example, this information, on the output device 128. According to one embodiment of the invention, the (x, y) coordinates based on the computational coordinate system as described with respect to FIG. 3 is transformed to the actual Cartesian coordinate system used to originally identify the position of the sensors 22. The transformed coordinates might further be transformed, for example, to latitude and longitude information, and mapped to a specific geographic address based on the latitude and longitude information. In this regard, a geographical mapping database conventional in the art may be used to identify the address based on the latitude and longitude information. Thus, the output in step 70 may be a specific address, a map of the address, or the like. In response to the output, emergency responders may be dispatched to the identified location to eliminate or contain the source of the hazardous substance. Furthermore, because the output also includes the predicted release rate, the emergency responders can determine how quickly and to which areas the hazardous substance is being released to, and act to evacuate the public to put them out of harms way based on this information.

Figure 7:
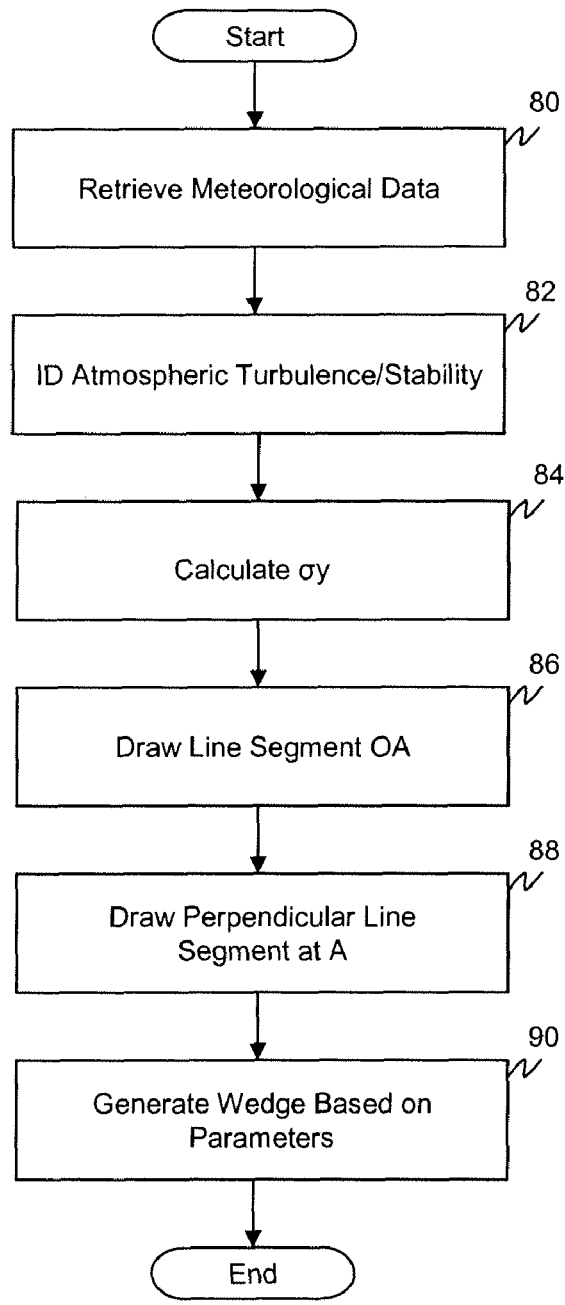
FIG. 7 is a more detailed flow diagram of a step of generating a reverse corridor for a specific substance sensor according to one embodiment of the invention.

FIG. 7 is a more detailed flow diagram of step 62 of generating a reverse corridor for a specific substance sensor 22 according to one embodiment of the invention. The steps of the process may be executed in the indicated order or in any other order recognized by a person of skill in the art.

In step 80, the processor receives meteorological data such as, for example, wind speed, wind direction, solar radiation, and the like, obtained by the meteorological sensor 16 according to conventional mechanisms well known in the art.

In step 82, the processor identifies the atmospheric turbulence based on the received data and atmospheric stability classes stored in the data store 18, and in step 84, calculates a dispersion parameter $\sigma_y$ based on the stability of the atmosphere. The dispersion parameter is used to generate a reverse corridor originating from the corresponding substance sensor and extending against a mean wind direction. In this regard, a line segment starting at the sensor location and parallel to the wind direction is drawn. In step 86, a distance x downward from the wind direction is measured from the sensor location O, and the point is marked as point A, for example, as is illustrated in FIG. 2. In step 88, a perpendicular line segment of length $2.14\sigma_y$ is drawn at point A. This defines the wedge angle 26 and hypotenuse legs of the wedge to allow the processor, in step 90, to calculate parameters of the reverse corridor for the particular sensor.

Figure 8:
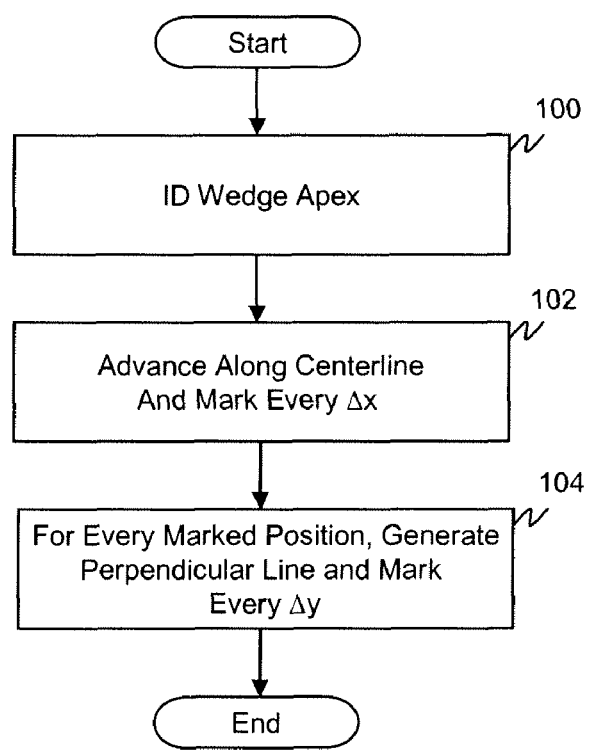
FIG. 8 is a more detailed flow diagram of a step for dynamically generating a mesh of a common search zone according to one embodiment of the invention.

FIG. 8 is a more detailed flow diagram of step 66 for dynamically generating a mesh of the common zone according to one embodiment of the invention. The steps of the process may be executed in the indicated order or in any other order recognized by a person of skill in the art.

In step 100, the processor identifies the apex 34 of the common wedge, which is marked as point R in the example illustrated in FIG. 3. The apex is designated as point (0, 0).

In step 102, the processor calculates a centerline from point R in an downward wind direction, and advances along the centerline and marks every $\Delta x$. For example, the processor may be configured to mark every 5 meters from the apex along the centerline, for a total of 10 km.

For every marked position, the processor generates, in step 104, a perpendicular line at each marked point and marks every $\Delta y$, progressing along the perpendicular line, until it intersects a boundary leg of the wedge. This generates the mesh of nodes which can then be examined to determine whether a particular node location is the source of the chemical release.

Figure 9:
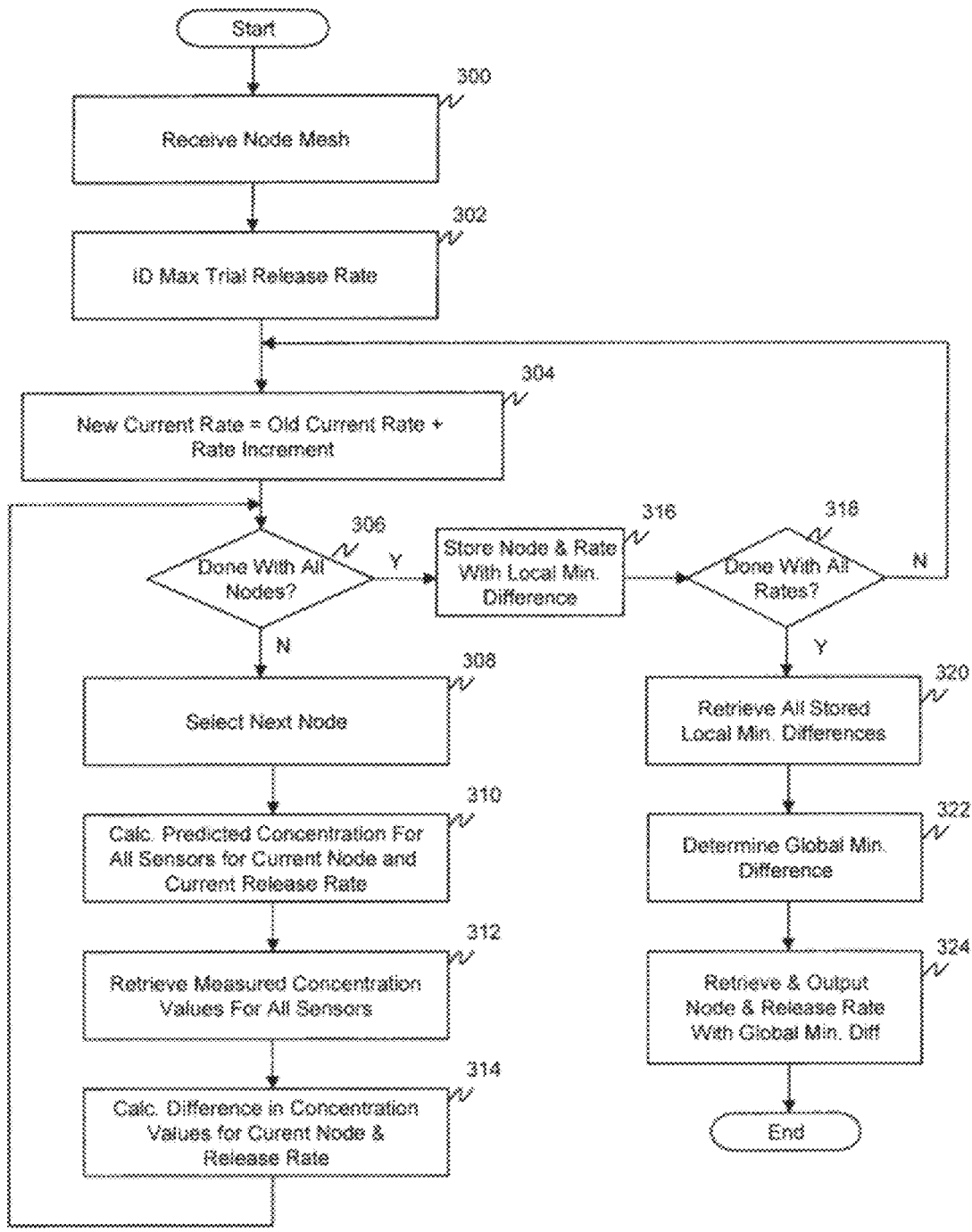
FIG. 9 is a more detailed flow diagram of a source location program according to one embodiment of the invention.

FIG. 9 is a more detailed flow diagram of the source location algorithm invoked in step 66 according to one embodiment of the invention. The steps of the process may be executed in the indicated order or in any other order recognized by a person of skill in the art.

In step 300, the processor receives the node mesh generated via the process of FIG. 8.

In step 302, the processor identifies a maximum trial release rate set for the system. Exemplary trial release rates may range from 0.01 kg/s to 10 kg/s.

In step 304, a new current release rate is calculated to be the old current release rate plus a predetermined rate increment value. An exemplary rate increment 0.01 kg/s. Thus, during a first iteration of the process, the current release rate is set to be 0.01 kg/s.

In step 306, a determination is made as to whether the process has considered all nodes in the mesh. If the answer is NO, the process proceeds to step 308 to select a next node in the mesh to test to determine if it is a potential release source.

In step 310, the process calculates a predicted concentration for all sensors for the current node based on the current trial release rate. In this regard, the process invokes a dispersion model such as, for example, the Gaussian dispersion model to model a release of the substance from the current node location and according to the current trial release rate. Application of a formula such as formula (3) for each substance sensor location 22 provides a predicted concentration measurement by the sensor. In this regard, $\sigma_y$, $\sigma_z$ dispersion coefficients are calculated for a distance computed from each node to each of the sensors, and the dispersion coefficients are used in formula (3) to calculate the predicted concentration measurements for the sensors.

In step 312, the processor retrieves the measured concentration at each of the sensor locations 22.

In step 314, the processor calculates a difference of the predicted concentration and the measured concentration for each of the sensors 22, and temporarily stores an average difference value in the memory 132. The process then returns to step 306 to consider the remaining nodes.

If all the nodes in the mesh have been considered as identified by the YES branch to decision step 306, the processor identifies, in step 316, a minimum stored difference value, referred to as a local minimum difference, and stores the location information of the node, or alternatively, an identification of the node, that generated the local minimum difference as well as the associated release rate.

In step 318, a determination is made as to whether all the trial release rates of the range considered have been evaluated. If the answer is NO, the process reverts back to step 304 to test the next release rate, and steps 306-316 are iterated with the new release rate.

When all the trial release rates have been considered, the processor retrieves, in step 320, all the stored local minimum differences. In step 322, the processor selects a smallest local minimum difference as a global minimum difference.

In step 324, the processor retrieves and outputs the location of the node and the trial release rate associated with the global minimum difference. According to one embodiment of the invention, before making the decision about the final predicted source location and release rate, the model results for various sensors located at multiple locations are weighed against each other and the readings from negligibly impacted and overly saturated sensors are eliminated from consideration.

Testing the model validity indicates that for a given release rate, the accuracy with which the model predicts the source location decreases with the increase in stability class. For higher stability classes (e.g. classes E and F) and low release rates (0.01 and 0.1 kg/s), the predicted source location values are more dispersed and farther from the actual source location for higher wind speeds of 3 m/s and 6 m/s. Nonetheless, the predicted source location values are still at a radius of 200 m from the actual source. Thus, without loss of generality, it can be concluded that under ideal conditions of no sensor fluctuations, the model can predict the source location within a 0-50 m radius from the actual source location for a wide range of wind speeds (1.5 to 6 m/s), except under conditions of very high stability classes (5 and 6) and very low release rates (0.01 and 0.1 kg/s), in which the source location can be predicted within 200 m radius from the actual source.

Although this invention has been described in certain specific embodiments, those skilled in the art will have no difficulty devising variations to the described embodiment which in no way depart from the scope and spirit of the present invention. Furthermore, to those skilled in the various arts, the invention itself herein will suggest solutions to other tasks and adaptations for other applications. It is the applicants intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A computer-implemented method for predicting a release location for a substance released into a surrounding medium, the method comprising:
   identifying, by a computer device, a plurality of search zones for the release location based on meteorological data provided by a meteorological sensor coupled to the computer device, each of the plurality of search zones being associated with one of a plurality of substance sensors;
   narrowing the search zone, by the computer device, to a common zone in which two or more of the plurality of search zones intersect;
   segmenting the common zone, by the computer device, into a plurality of nodes, each of the plurality of nodes being associated with location information;
   identifying, by the computer device, a local minimum for each of a plurality of trial release rates, wherein each identified local minimum is a difference between a predicted concentration and a measured concentration of the substance by the plurality of substance sensors that generates a least error for a plurality of trial release locations associated with the plurality of nodes, wherein each identified local minimum is associated with a particular one of the plurality of nodes and a particular one of the plurality of trial release rates;

selecting, by the computer device, a smallest one of the plurality of local minima as a global minimum value;

identifying, by the computer device, the location information of the node and the trial release rate associated with the global minimum value; and outputting, by the computer device, the identified location information and release rate as the predicted release location and release rate for the hazardous substance.

2. The method of claim 1, wherein the identifying of each local minimum includes:

predicting, by the computer device, for each of the plurality of nodes, the concentration of the substance at each of the plurality of substance sensors based on an assumption that the substance is released from the trial release location associated with the corresponding node at a particular one of the plurality of trial release rates;

obtaining, by the computer device, a measured concentration of the substance at each of the plurality of substance sensors;

comparing, by the computer device, an average of each of the predicted concentrations for the plurality of the substance sensors against an average of the measured concentrations by the plurality of the substance sensors; and storing by the computer device, as the local minimum for the particular one of the plurality of trial release rates, a smallest difference between the average predicted concentration for a particular one of the nodes and the average measured concentration.

3. The method of claim 1, wherein each of the search zones is a reverse corridor originating from the corresponding substance sensor and extending against a mean wind direction, wherein the mean wind direction is obtained from the meteorological data.

4. The method of claim 3, wherein the reverse corridor is formed as a wedge with an apex at the corresponding substance sensor, wherein an angle of the wedge is based on atmospheric turbulence information.

5. The method of claim 4, wherein the atmospheric turbulence information is determined based on the meteorological data.

6. The method of claim 1, wherein the meteorological data includes wind speed and direction.

7. The method of claim 1, wherein the computer device invokes a Gaussian dispersion model for predicting the concentration of the substance at each of the plurality of substance sensors for each of the plurality of nodes.

8. A system for predicting a release location for a substance released into a surrounding medium, the system comprising:

a plurality of substance sensors each configured to detect a concentration of the substance at a corresponding sensor location;

means for obtaining meteorological data;

a processor coupled to the plurality of sensors and the means for obtaining meteorological data; and a memory operably coupled to the processor and storing program instructions therein, the processor being operable to execute the program instructions, the program instructions including:

identifying a plurality of search zones for the release location based on the meteorological data, each of the plurality of search zones being associated with one of the plurality of substance sensors;

narrowing the search zone to a common zone in which two or more of the plurality of search zones intersect;

segmenting the common zone into a plurality of nodes, each of the plurality of nodes being associated with location information;

identifying a local minimum for each of a plurality of trial release rates, wherein each identified local minimum is a difference between a predicted concentration and a measured concentration of the substance by the plurality of substance sensors that generates a least error for a plurality of trial release locations associated with the plurality of nodes, wherein each identified local minimum is associated with a particular one of the plurality of nodes and a particular one of the plurality of trial release rates;

selecting a smallest one of the plurality of local minima as a global minimum value;

identifying the location information of the node and the trial release rate associated with the global minimum value; and outputting the identified location information and release rate as the predicted release location and release rate for the hazardous substance.

9. The system of claim 8, wherein the program instructions for identifying of each local minimum includes program instructions for:

predicting for each of the plurality of nodes, the concentration of the substance at each of the plurality of substance sensors based on an assumption that the substance is released from the trial release location associated with the corresponding node at a particular one of the plurality of trial release rates;

obtaining a measured concentration of the substance at each of the plurality of substance sensors;

comparing an average of each of the predicted concentrations for the plurality of the substance sensors against an average of the measured concentrations by the plurality of the substance sensors; and storing as the local minimum for the particular one of the plurality of trial release rates, a smallest difference between the average predicted concentration for a particular one of the nodes and the average measured concentration.

10. The system of claim 8, wherein each of the search zones is a reverse corridor originating from the corresponding substance sensor and extending against a mean wind direction, wherein the mean wind direction is obtained from the meteorological data.

11. The system of claim 10, wherein the reverse corridor is formed as a wedge with an apex at the corresponding substance sensor, wherein an angle of the wedge is based on atmospheric turbulence information.

12. The system of claim 11, wherein the atmospheric turbulence information is determined based on the meteorological data.

13. The system of claim 8, wherein the meteorological data includes wind speed and direction.

14. The system of claim 8, wherein the program instructions further invoke a Gaussian dispersion model for predicting the concentration of the substance at each of the plurality of substance sensors for each of the plurality of nodes.

15. A non-transitory computer readable media embodying program instructions for execution by a computer device, the program instructions adapting the computer device for predicting a release location for a substance released into a surrounding medium, the program instructions comprising:

identifying a plurality of search zones for the release location based on meteorological data provided by a meteorological sensor coupled to the computer device, each of the plurality of search zones being associated with one of a plurality of substance sensors;

narrowing the search zone to a common zone in which two or more of the plurality of search zones intersect;

segmenting the common zone into a plurality of nodes, each of the plurality of nodes being associated with location information;

identifying a local minimum for each of a plurality of trial release rates, wherein each identified local minimum is a difference between a predicted concentration and a measured concentration of the substance by the plurality of substance sensors that generates a least error for a plurality of trial release locations associated with the plurality of nodes, wherein each identified local minimum is associated with a particular one of the plurality of nodes and a particular one of the plurality of trial release rates;

selecting a smallest one of the plurality of local minima as a global minimum value;

identifying the location information of the node and the trial release rate associated with the global minimum value; and outputting the identified location information and release rate as the predicted release location and release rate for the hazardous substance.

16. The non-transitory computer readable media of claim 15, wherein the program instructions for identifying each local minimum include program instructions for:

predicting for each of the plurality of nodes, the concentration of the substance at each of the plurality of substance sensors based on an assumption that the substance is released from the trial release location associated with the corresponding node at a particular one of the plurality of trial release rates;

obtaining a measured concentration of the substance at each of the plurality of substance sensors;

comparing an average of each of the predicted concentrations for the plurality of the substance sensors against an average of the measured concentrations by the plurality of the substance sensors; and storing as the local minimum for the particular one of the plurality of trial release rates, a smallest difference between the average predicted concentration for a particular one of the nodes and the average measured concentration.

17. The non-transitory computer readable media of claim 15, wherein each of the search zones is a reverse corridor originating from the corresponding substance sensor and extending against a mean wind direction wherein the mean wind direction is obtained from the meteorological data.

18. The non-transitory computer readable media of claim 17, wherein the reverse corridor is formed as a wedge with an apex at the corresponding substance sensor, wherein an angle of the wedge is based on atmospheric turbulence information.

19. The non-transitory computer readable media of claim 18, wherein the atmospheric turbulence information is determined based on the meteorological data.

20. The non-transitory computer readable media of claim 15, wherein the program instructions invoke a Gaussian dispersion model for predicting the concentration of the substance at each of the plurality of substance sensors for each of the plurality of nodes.

21. A computer device for predicting a release location for a substance released into a surrounding medium, the computer device comprising:

a processor; and a memory operably coupled to the processor and storing program instructions therein, the processor being operable to execute the program instructions, the program instructions including:

identifying a plurality of search zones for the release location based on meteorological data, each of the plurality of search zones being associated with one of a plurality of substance sensors;

narrowing the search zone to a common zone in which two or more of the plurality of search zones intersect;

segmenting the common zone into a plurality of nodes, each of the plurality of nodes being associated with location information;

identifying a local minimum for each of a plurality of trial release rates, wherein each identified local minimum is a difference between a predicted concentration and a measured concentration of the substance by the plurality of substance sensors that generates a least error for a plurality of trial release locations associated with the plurality of nodes, wherein each identified local minimum is associated with a particular one of the plurality of nodes and a particular one of the plurality of trial release rates;

selecting a smallest one of the plurality of local minima as a global minimum value;

identifying the location information of the node and the trial release rate associated with the global minimum value; and outputting the identified location information and release rate as the predicted release location and release rate for the hazardous substance.

22. The computer device of claim 21, wherein the program instructions for identifying each local minimum include program instructions for:

predicting for each of the plurality of nodes, the concentration of the substance at each of the plurality of substance sensors based on an assumption that the substance is released from the trial release location associated with the corresponding node at a particular one of the plurality of trial release rates;

obtaining a measured concentration of the substance at each of the plurality of substance sensors;

comparing an average of each of the predicted concentrations for the plurality of the substance sensors against an average of the measured concentrations by the plurality of the substance sensors; and storing as the local minimum for the particular one of the plurality of trial release rates, a smallest difference between the average predicted concentration for a particular one of the nodes and the average measured concentration.

23. The computer device of claim 21, wherein each of the search zones is a reverse corridor originating from the corresponding substance sensor and extending against a mean wind direction wherein the mean wind direction is obtained from the meteorological data.

24. The computer device of claim 23, wherein the reverse corridor is formed as a wedge with an apex at the corresponding substance sensor, wherein an angle of the wedge is based on atmospheric turbulence information.

25. The computer device of claim 24, wherein the atmospheric turbulence information is determined based on the meteorological data.

26. The computer device of claim 21, wherein the program instructions invoke a Gaussian dispersion model for predicting the concentration of the substance at each of the plurality of substance sensors for each of the plurality of nodes.

* * * * *